UNITED STATES PATENT OFFICE.

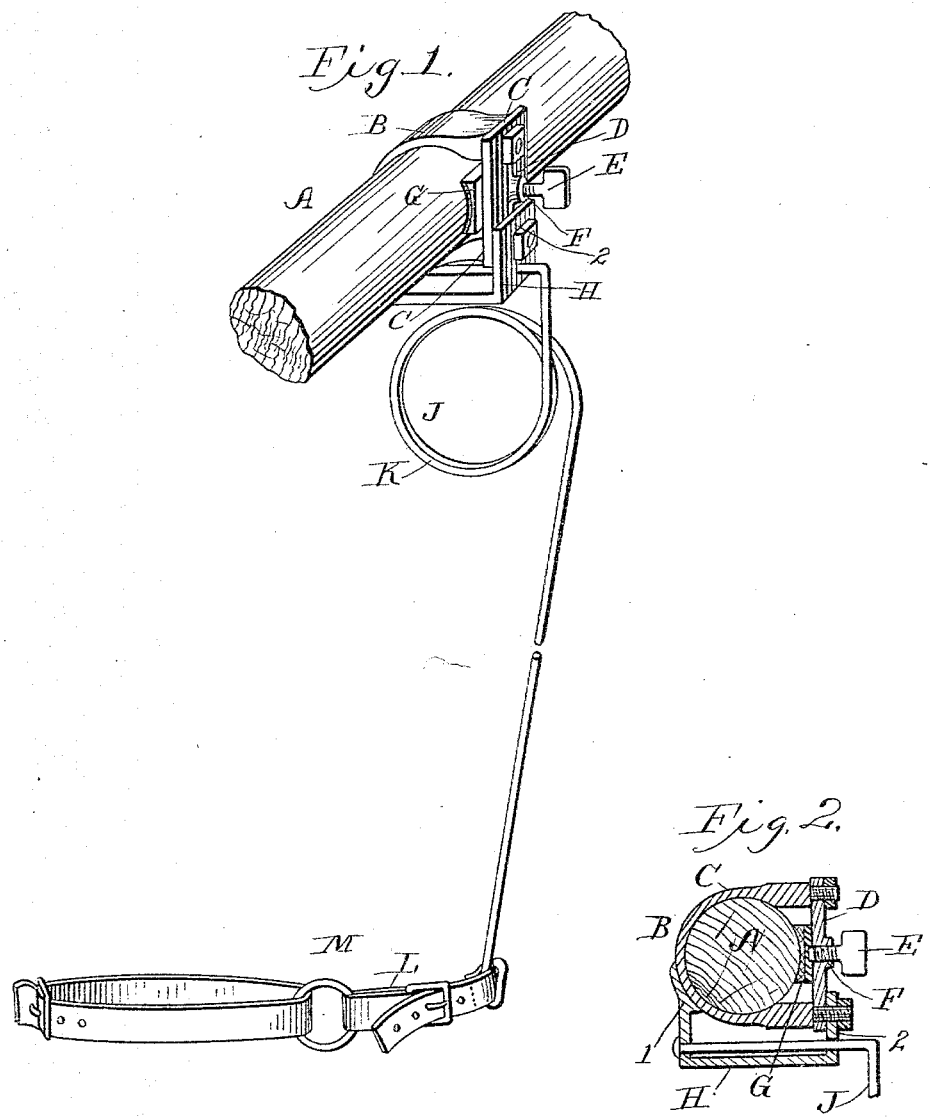

CHARLES L. PASSMORE, OF FULTON, ILLINOIS, ASSIGNOR OF ONE-HALF TO EDWIN L. PASSMORE, OF SAME PLACE.

KNEE-SPREADER FOR HORSES.

SPECIFICATION forming part of Letters Patent No. 545,413, dated August 27, 1895.

Application filed May 9, 1894. Renewed June 25, 1895. Serial No. 554,051. (No model.)

*To all whom it may concern:*

Be it known that I, CHARLES L. PASSMORE, a citizen of the United States, residing at Fulton, in the county of Whiteside and State of Illinois, have invented certain new and useful Improvements in Knee-Spreaders for Horses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in knee-spreaders for horses; and it consists of the mechanism hereinafter more particularly described for the purpose of assisting the horse in keeping his knees and legs from striking each other when traveling at a high rate of speed.

It is well known to those at all familiar with the care and training of fast horses that after a certain degree of speed is reached a majority of horses will strike their knees and legs against each other in passing, so that they not only injure their legs, but interfere with their speed, and finally, if not alleviated in some mode, "break themselves up," as it is called. As a matter of fact, a very slight lateral outward draft upon the horse's leg, when the latter is lifted from the ground, is sufficient to prevent the aforesaid interference; but horses under the excitement of a race or high speed are likely to throw their forward legs obliquely to one side or to jump with their fore legs to the right or left of the line of movement. It is therefore indispensable that any device to be successfully used to draw the leg of the animal outwardly must be so constructed as to give way before the horse's leg when the latter approaches it, so that the horse may not injure either himself or the device. It is important, also, that should the horse swing his leg laterally away from the governing device, the latter should follow said leg with an increased tension, tending gradually to draw the leg back into its proper line of movement. As a matter of experience it has been demonstrated that my invention will not only prevent interference while attached to the animal, but will in a short time so educate the animal in the proper movement of his legs that he will thereafter keep his legs sufficiently apart to not strike in passing each other. I attain the purpose aforesaid by the mechanism illustrated in the accompanying drawings, in which—

Figure 1 represents a perspective of my device in place upon the thill of the vehicle and flexed inward toward its lower end in about the position of ordinary use. Fig. 2 is an enlarged detail of the parts involved in attaching the device to the shaft.

Similar letters refer to similar parts in each view.

As the device is used in duplicate—that is to say, upon each thill—and their construction and mode of operation are the same, the only difference being that they are set reversely, I do not deem it necessary to show and describe more than the construction, location, and operation of one of the devices.

A is a section of a thill about opposite the fore leg of the animal when at rest.

B is a clip surrounding the thill A and having its free ends C C projected through the clip-block D and there secured in any suitable manner.

E is a thumb-screw seated loosely in the central threaded opening F of the clip-block D and pivoted at its inner end in a follower G, which is carried to and from the outer side of the thill A by the rotation of the thumb-screw E. By this means the clip B is rigidly and readily seated at any point on the thill A.

A bracket H is rigidly supported on the lower surface of and externally to the clip B by having its inner limb 1 rigidly attached in any suitable mode to the lower surface of the clip B and its outer limb 2 seated between the clip-block D and the nut or rivet on the extremity of the lower limb C of the clip B. A spring-wire J is loosely seated at its outer end horizontally and transversely in the limbs of the bracket H, and after one or more coils K are formed therein to increase its resiliency is extended downward and outward in its normal position. A short adjustable strap L is attached to the lower end of the spring J, to the opposite end of which is attached a flexible band M, designed to pass around the fore leg of the horse at about the knee.

In attaching the lower end of spring J to the leg of the horse, as aforesaid, the lower end of wire J is drawn in to within a few inches of the horse's leg, in which position the wire, being drawn inward from its normal projection, tends to draw slightly outward on the leg of the animal. This tension can be increased or diminished by changing the length of the connecting-strap L.

The operation of my invention is as follows: The parts being placed as aforesaid, one of said devices on each thill, there is a constant outward slight drawing on each fore leg of the animal. When the horse raises his foot to make a forward movement, this outward drawing moves his leg slightly outward during the time that it is in the air and of course during the time that this leg is passing the other. Inasmuch as the interference is caused by a very slight deviation inward of the moving leg while passing the other, a very slight outer draft on the moving leg will cause it to clear the other one. The journal or pivotal supports of the upper and horizontal portion of the wire J in the bracket H permit the lower end of the wire J to oscillate forward and backward to accord with the movement of the horse's leg, and the long end of said wire has such a leverage on the pivoted portion thereof that substantially no force is required to move the lower end of the spring J forward and back. If the horse should casually jump sidewise or throw his leg under the thill, the wire J, by its own elasticity, will withdraw itself laterally as the horse's leg approaches it and therefore prevent any collision between the leg of the animal and the said spring. On the other hand, should the horse be disposed to throw his leg inward from the thill, the spring J will follow the movement, but under an increased pressure, tending to bring the leg back into proper line. By simply releasing the thumb-screw E and slipping the upper end of the device over the end of the thill and unbuckling the band M the device can be at once removed, and it can as readily be placed in position for use. The clip B can be adjusted to and fro on the thill A to accommodate it to horses of different lengths.

What I claim as my invention, and desire to secure by Letters Patent of the United States, is—

In a knee spreading device, the combination, with a clip block, of a clip, the free ends of which project through the block and are each provided with a nut, a follower and a set screw connected with the block, a bracket engaging with the clip at one end and having its opposite end bent at an angle and seated between the clip block and the nut on the lower end of the clip, a downwardly projecting spring, the upper end of which is bent at an angle and journaled transversely in the bracket, and a strap at the lower end of the spring, for connecting it with the leg of a horse, substantially as set forth.

In testimony whereof I affix my signature in presence of two witnesses.

CHARLES L. PASSMORE.

Witnesses:
JOHN G. MANAHAN,
IRVING L. WEAVER.